United States Patent [19]

Kawamura et al.

[11] Patent Number: 4,911,109
[45] Date of Patent: Mar. 27, 1990

[54] COOLING SYSTEM FOR HEAT INSULATING ENGINE

[75] Inventors: Hideo Kawamura, Samukawa; Hiroshi Matsuoka, Yamato, both of Japan

[73] Assignee: Isuzu Motors Limited, Tokyo, Japan

[21] Appl. No.: 217,267

[22] Filed: Jul. 11, 1988

[30] Foreign Application Priority Data

Jul. 11, 1987 [JP] Japan .................. 62-172088
Oct. 9, 1987 [JP] Japan .................. 62-253566
Oct. 9, 1987 [JP] Japan .................. 62-253567
Oct. 9, 1987 [JP] Japan .................. 62-253569

[51] Int. Cl.⁴ ............................. F02B 75/18
[52] U.S. Cl. ....................... 123/41.74; 123/41.82 R; 123/193 CH; 123/668
[58] Field of Search ............... 123/41.15, 41.2, 41.21, 123/41.69, 41.72, 41.74, 41.82 R, 41.82 A, 193 P, 193 C, 193 H, 193 CP, 668, 669

[56] References Cited

U.S. PATENT DOCUMENTS 4,532,896 8/1985 Nakahara et al. ............ 123/193 H
4,590,901 5/1986 Mizuhara ..................... 123/669
4,774,926 10/1988 Adams ......................... 123/193 H

FOREIGN PATENT DOCUMENTS 0075844 4/1983 European Pat. Off. .
3442488 6/1985 Fed. Rep. of Germany .
57-191414 11/1982 Japan .
59-170446 9/1984 Japan ........................ 123/669
60-13957 1/1985 Japan .
60-15921 2/1985 Japan .
60-30451 2/1985 Japan ........................ 123/669
60-90958 5/1985 Japan .
60-93157 5/1985 Japan .
60-201057 10/1985 Japan .
61-14715 1/1986 Japan .
2058912 4/1981 United Kingdom .

Primary Examiner—Noah P. Kamen
Attorney, Agent, or Firm—Browdy and Neimark

[57] ABSTRACT

The upper parts of the cylinder liners and the cylinder head are formed integral in one piece, and a water jacket is provided around the outer peripheries of the upper parts of the cylinder walls, with no water jacket provided to the cylinder body. This eliminates the use of the core for the water jacket in molding the cylinder body, which in turn reduces the engine weight, brings about a significant cost reduction and makes machining operations easy. Because the piston head is made of a heat insulating material and a water jacket is not provided to the cylinder body, the heat is prevented from flowing down to the cylinder liners. Furthermore, the cylinder liners are made of a ceramic material to improve an anti-galling characteristic during sliding motions at high temperatures. Also, since the water jacket is provided only to the cylinder head, the water jacket can be made simple and small in structure, reducing the cooling water flow resistance. This in turn permits the use of a small motor-powered water pump that can be controlled independently of the engine conditions. Moreover, since the cylinder body has no water jacket, there is a greater freedom in designing the cylinder body, which makes it possible to form reinforcement ribs on the cylinder body to increase its rigidity and thereby reduce vibrations and noise.

26 Claims, 5 Drawing Sheets

COOLING SYSTEM FOR HEAT INSULATING ENGINE

BACKGROUND OF THE INVENTION

Field of the Invention

The present invention relates to a cooling system for heat insulating engines made of ceramic materials.

Description of the Prior Art

Figure 8:
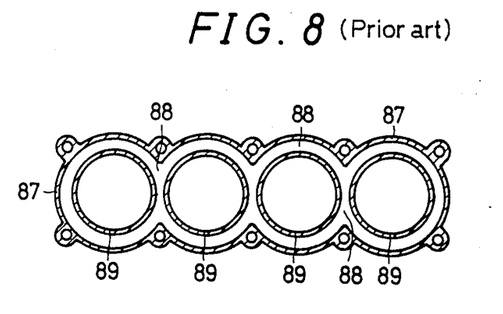
FIG. 8 is a cross sectional view of a cylinder block in a conventional engine cooling system and FIG. 9 is a cross sectional view showing an example of a conventional cooling system for heat insulating engines.

In general reciprocal engines, the exterior of the reciprocating piston is cooled either by water or air to enable continued smooth reciprocating motion of the piston. When a combustion chamber defined by a cylinder liner, a cylinder head and a piston head is heat-insulated, the combustion energy of the fuel is contained in the exhaust gas or converted into work. In conventional cooling systems of the engines, cooling chambers or water jackets 88 are formed, as shown in FIG. 8, not only in the cylinder head and in the upper part of the cylinder liner but also in a cylinder block 87 at the lower part of the cylinder liner 89 in which the piston reciprocates. These water jackets occupy a large space in the engine and their complicated shapes make the casting and machining operations difficult, which in turn makes it impossible to reduce the weight and cost of the engines. Furthermore, since the amount of cooling water is large, it takes time for the cooling water to become warm, requiring a longer idling of the engine.

Figure 9:
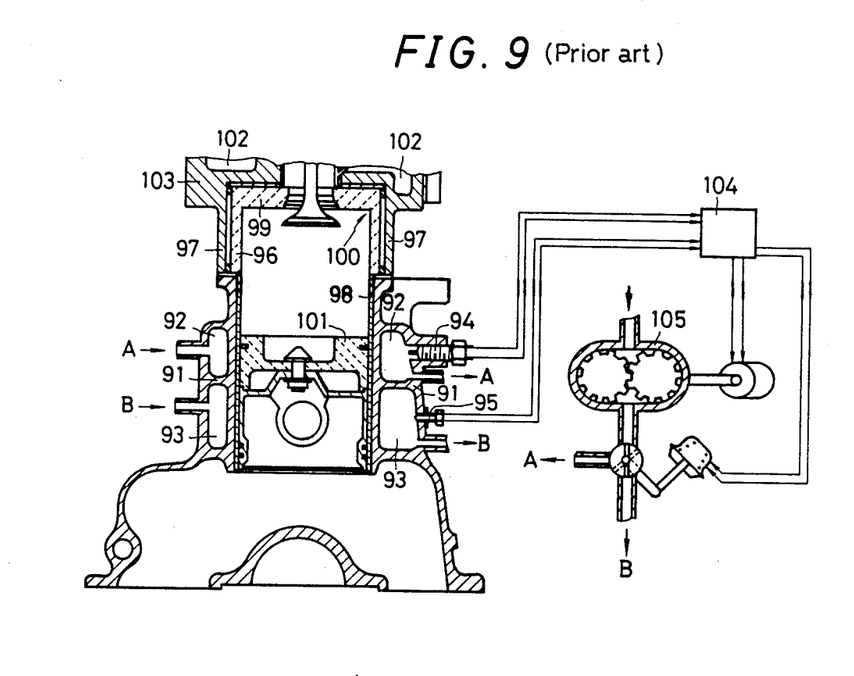

A conventional cooling system for the heat insulating engine is disclosed, for example, in the Japanese Utility Model Laid-Open No. 15921/1985. This cooling system for the heat insulating engine will be explained by referring to FIG. 9. The heat insulating engine cooling system consists of: cooling chambers 92, 93 formed in two vertically separated layers in a cylinder block 91 around the lower part of the cylinder liner; temperature sensors 94, 95 installed in the cooling chambers 92, 93 to detect the temperatures of coolant; and a controller 104 for sending to a coolant driving means 105 a coolant flow velocity control signal corresponding to the detected temperature signals from the temperature sensors 94, 95. The controller 104 controls the flow speed of the coolant in the cooling chambers 92, 93. Inside a cylinder head 103—formed integral with an extension 97 surrounding the upper part of the cylinder liner—is fitted a liner head 100 which consists of a cylinder head internal wall portion 99 and an upper part 96 of the cylinder liner, formed in one piece. Cooling chambers 102 are formed near the cylinder head 103. The cylinder block 91 and the cylinder head 103 are made of casting. The liner head 100 is made of a silicon nitride ($Si_3N_4$) or partially stabilized zirconia (PSZ). The cylinder liner 98 is formed of PSZ and securely installed into the cylinder block 91 through shrink fit or press fit. The piston head 101 is made of silicon nitride. In the figure, the reference symbol A and B represent the directions of coolant flow.

A cylinder head cooling system for the heat insulating engine disclosed in the Japanese Utility Model Laid-Open No. 14715/1986 has a combustion chamber which has a heat insulating structure formed of a ceramic material. In this heat insulating structure, the coolant flow to the water jacket formed in the cylinder head around the exhaust valve is controlled according to a specified engine characteristic value to maintain the performance of the exhaust valve. That is, the cooling system has a coolant control means which, according to the exhaust gas temperature, revolution speed, and boosting pressure of the engine, supplies the coolant into the water jacket that is formed in the metal cylinder head body assembled on the head plate or at least around the exhaust valve.

The Japanese Patent Laid-Open No. 191414/1982 discloses a cooling system for reciprocating engines in which cooling chambers are formed in the cylinder head and in the cylinder body around the upper and lower part of the cylinder liner. The cooling system has an engine water pump controller which consists of: a driving device for driving the water pump independently of the engine revolution speed; a temperature sensor for detecting the engine temperature; and a controller which controls the water pump driving device in such a way as to increase the water pump revolution speed when the engine temperature from the temperature sensor is higher than the stabilized temperature by more than a setting value.

A cylinder block for the internal combustion engine disclosed in the Japanese Patent Laid-Open No. 13957/1985 is similar to the one 87 shown in FIG. 8. The cylinder block has water jackets formed around a plurality of cylinders. Side walls arranged outside the cylinders are formed recessed inwardly between the cylinders. The notable structure of this cylinder block is that first reinforcement ribs and second reinforcement ribs are formed on the cylinder block. The first reinforcement ribs are formed projecting externally from the side walls between the cylinders near the lower deck to connect the adjacent side walls. The second reinforcement ribs are formed projecting externally from the side walls to connect the upper and lower parts of the cylinder block through the first reinforcement ribs. This type of cylinder block has the water jackets in which cooling water is circulated, and these ribs are formed on the cylinder block around the water jacket. The ribs are intended to increase the rigidity and strength of the cylinder block, thereby preventing deformation and reducing vibration. However, no measures have yet been taken as to the cylinder liner which is a source of noise.

SUMMARY OF THE INVENTION

The main object of the invention is to provide a cooling system for heat insulating engines which overcomes the above problems by taking into consideration the fact that the amount of heat transmitted in the reciprocating engine increases as the working gas pressure and temperature increase and that it is not large when the working gas pressure and temperature are low. In more detail, the power stroke, which is most important in the engine operation, is complete about 70° in crank angle after the piston has reached the top dead center (TDC). During the power stroke, the gas in tee combustion chamber defined by the cylinder liner, cylinder head and piston head has high temperature and pressure, so that the amount of heat transmitted is large. The amount of heat transmitted after this power stroke is about 30% of the entire heat generated. Taking advantage of this fact, the cooling system of the invention has enabled an effective heat dissipation from the high temperature portions near the top dead center of the piston. This in turn eliminates the need for cooling the lower part of the cylinder liner by the cooling water. With the engine cooling requirements reduced to the minimum, the engine can be made small, improving the machinability of the engine, reducing its weight, achieving a significant cost reduction. The cooling system for the insulating engine according to this invention can also cool the high temperature parts very effectively and swiftly by flowing the cooling water smoothly. Furthermore, the water pump used in the cooling system is reduced in size. The cooling water in this system can be warmed quickly, reducing the required idling time of the engine.

Another object of the invention is to provide a cooling system for heat insulating engines in which, to achieve the above main objective, the upper part of the cylinder wall and the cylinder head are formed in one piece, water jackets are provided only to the outer periphery of the upper part of the cylinder wall and to the underside of the cylinder head, and the water jacket is eliminated from the cylinder body which forms cylinders.

A further object of the invention is to provide a cooling system for heat insulating engines in which the water jacket is formed around the outer periphery of the upper part of the cylinder wall to enable the water jacket passage around the outer periphery of the combustion chamber to be formed in a shape most suited for heat dissipation, i.e., in such a simple structure as to allow smooth flow of cooling water, thereby permitting the high-temperature portions to be cooled very effectively and quickly by flowing the cooling water quickly and smoothly. For this cooling system, the mold is made simple to make machining operations easy and the engine is also formed small and lightweight to reduce the cost of engine. In this cooling system, since the water jacket is small with the required cooling water flow small and with the flow resistance reduced, the cooling water pump can also be reduced in size. Moreover, since the cooling water flow is small, the water can be warmed to a specified temperature in a very short time, reducing the idling time for the idling system that uses the cooling water.

Still further object of the invention is to provide a cooling system for heat insulating engines in which the water jacket is removed from the cylinder body in which the cylinder liners are tightly fitted, so that the core for the water jacket when molding the cylinder body can be eliminated, making the machining operation of the cylinder body easy, reducing the size and weight of the engine, achieving a significant cost reduction in the manufacture of the engine.

Still another object of the invention is to provide a cooling system for heat insulating engines in which, to compensate for not providing a water jacket in the cylinder body, the piston head is formed of an insulating material and lower part of the cylinder liner is formed of a ceramic material to prevent heat of the combustion chamber from flowing to the lower part of the cylinder liner and thereby improve resistance against galling due to high-temperature sliding motions between the piston or piston rings and the cylinder liner. Another feature of the cooling system according to the invention is that, in forming the piston head with a ceramic material which is exposed to the burning gas in the combustion chamber, the ceramic material of the piston head can be made as thin as possible to reduce its thermal capacity nd thereby improve the suction efficiency and cycle efficiency of the engine.

A further object of the invention is to provide a cooling system for heat insulating engines in which the water jackets formed around the outer periphery of the upper parts of the cylinder heads forming each combustion chamber are directly communicated with each other and the cooling passages are formed to circulate the cooling water in one direction from one and of the cylinder head to the other end; and in which the underside of the cylinder head and the entire circumference of the upper parts of the cylinder walls are cooled to dissipate heat from the heated portion of the upper part of the cylinder head subjected to high gas pressures and high temperatures, i.e., from the portion near the top dead center of the piston. In this cooling system, the cooling water smoothly circulates, with only a small resistance, from the upper part of a cylinder wall at one end of the engine to the upper part of a cylinder liner at the other end, effectively and quickly cooling the wall surfaces of the upper part of each cylinder wall, with the result that almost all the heat generated is taken away from the high-temperature portion, preventing the heat of the combustion chamber from flowing to the lower part of the cylinder liner. This allows the water jacket to be removed from the cylinder liner. Another advantage of this cooling system is that the wall surface of the cooling system can be made as small as possible and the water jacket made as simple as possible so that the cooling water can flow smoothly with only a small resistance, making it possible to reduce the size and weight of the water jacket and therefore the water pump.

A still further object of the invention is to provide a cooling system for heat insulating engines in which the water jacket is provided around the outer periphery of the upper part of the cylinder wall so that a motor-powered water pump or circulating the cooling water between the water jacket and the radiator can be controlled according to a signal from the temperature sensor attached to the cylinder head. With this cooling system, the number of portions to be cooled can be minimized and the water jacket can be formed in a simple shape with a small resistance against the cooling water flow, which permits the use of a small motor-powered water pump. Also, since the motor-powered water pump can be driven by power obtained from an energy recovery equipment installed on the heat insulating engine to control the cooling water circulation flow according to the signal of the temperature sensor, independently of the engine running condition, the cooling water temperature control can be performed with precision, preventing the over-cooling of the engine. When the inlets and outlets for the cooling water that circulates through the water jackets are arranged in two vertically separated layers so that the water flows through the inlets and outlets in one direction, the piping can be arranged close together and this reduces the length of piping and makes piping work simple, increasing the freedom of piping layout.

Yet another object of the invention is to provide a cooling system for heat insulating engines in which the water jacket is provided to cool only the upper parts of the cylinder walls and the cylinder head and the water jacket is removed from the cylinder body in which the cylinder liners are tightly fitted. With this cooling system, it is possible to form lateral and longitudinal ribs on the outer surface of the cylinder body in which the cylinder liners—a source of noise—are tightly fitted so that the cylinder liners are reinforced, increasing their rigidity and deformation resistance, reducing noise and vibrations from he cylinder body and particularly the cylinder liners.

DETAILED DESCRIPTION OF THE INVENTION

The cooling system for heat insulating engines according to the invention will be described in detail by referring to the attached drawings.

Figure 1:
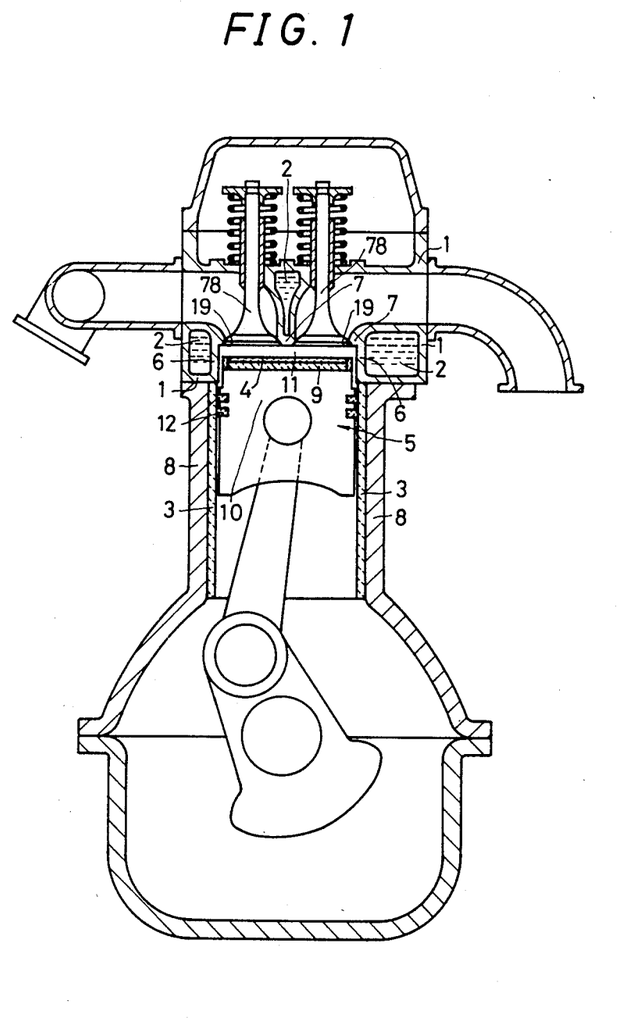
FIG. 1 is a cross sectional view showing a cooling system for heat insulating engines as one embodiment of the invention.

FIG. 1 shows a cooling system for heat insulating engines as one embodiment of this invention. The heat insulating engine equipped with the cooling system of the invention has a partly heat-insulated structure which consists mainly of: a cylinder body 8 or a cylinder block forming cylinders; cylinder liners 3 formed of a ceramic material that are tightly fitted in the cylinders of the cylinder body 8; and pistons 5 which have piston heads 4 formed of a ceramic material and mounted to piston bodies 10 through a heat insulating material 9. The upper part 6 of cylinder wall is situated on the top of the cylinder liner 3 with a stepped liner formed between the upper part 6 of the cylinder wall and the cylinder liner 3. The upper part 6 of the cylinder wall, the cylinder liner 3, the underside 7 of the cylinder head and the piston head 4 define a combustion chamber 11. The underside 7 of the cylinder head on the side of the combustion chamber 11 is formed integral with the cylinder head 1. The upper part 6 of the cylinder wall and the cylinder head 1 are also formed in one piece. The underside 7 of the cylinder head is formed with valve seats 19 of intake and exhaust ports on which intake and exhaust valves 78 are seated. The cylinder head 1 and the upper parts 6 of the cylinder walls are made of a metal, such as cast iron, but they have a water jacket 2 formed therein. In other words, the water jacket 2 formed in the cylinder head 1 extends along the outer circumference of the upper parts 6 of the cylinder walls. The water jacket 2 is designed to cool parts facing the combustion chamber 11 and especially a high-temperature portion near the top dead center of the piston 5, so that no problem will arise from the heat generated at the high-temperature portion. Since the water jacket 2 is provided only to the cylinder head 1 and the upper parts 6 of the cylinder walls, it is possible to make the structure of the water jacket 2 very simple, which in turn reduces the cooling water flow resistance. This in turn permits the use of a small capacity water pump for circulating the cooling water.

The cylinder body 8 has the cylinder liners 3—which form cylinder bores—tightly fitted therein. That is, the cylinder liners 3 are fitted into the cast cylinder body 8 through molding, press fit or shrink fit, and are made of a ceramic material such as zirconia, silicon nitride and silicon carbide. The cylinder liner 3 is structured so that the piston 5 can be reciprocated therein. Because it is not heated to high temperatures or subjected to high pressures, the cylinder liner 3 is made of a ceramic material to provide a heat insulating effect and improve a seizing resistance. If the cylinder body 8 is constructed n this way, it does not require a water jacket around the circumference of the cylinder liners 3, nor air-cooling fins. Thus, in molding the cylinder body, the core for the water jacket can be eliminated with the result that the cylinder body can very easily be machined, contributing to reduction in the weight of engine and also to a substantial cost reduction.

As for the piston 5, the piston head 4 facing the combustion chamber 11 is made of a ceramic material and mounted to the piston body 10 through a ceramic insulating material 9. Though not shown, the piston head 4 and the piston body 10 may preferably be assembled as follows. A ring member of the same ceramic material as the piston head 4 is secured to the outer circumferential surface of the piston head 4 through chemical vapor deposition to enclose the insulating material 9 from the burning gas. Then, the ceramic material of the piston head 4 and the insulating material 9 of ceramics or potassium titanate at the piston head portion prevent the heat generated in the combustion chamber 11 from flowing down to the cylinder liner 3. Piston rings 12 of ceramics are installed in piston ring grooves on the piston body 10.

As for the combustion chamber 11, the piston head side may be recessed or the upper part of the cylinder wall may be formed with a step. To accommodate the fuel injection nozzle, it is also possible to make the cylinder head rise radially outwardly to form the combustion chamber near the inner circumferential surface of the upper part of the cylinder wall.

In the piston 5, the piston head 4 having a ceramic material formed flat on the side of the combustion chamber 11 is secured to the piston body 10 with the insulating material 9 interposed. The ceramic material of the pistoin head 4 is made of silicon nitride or silicon carbide and formed thin to reduce the thermal capacity of that part of the piston head 4. With the piston head 4 forming a flat surface, the cylinder head may be formed in such a way that the central part of the cylinder head is recessed while its outer circumferential part is raised, in order to form a combustion chamber 11 (not shown).

The insulating material 9 at the piston head portion may be made of such materials as potassium titanate, potassium titanate whisker, zirconia fiber, and alumina fiber. These materials not only have a good heat insulating characteristic but also serve as a structural member that absorbs pressures generated during detonation.

Figure 2:
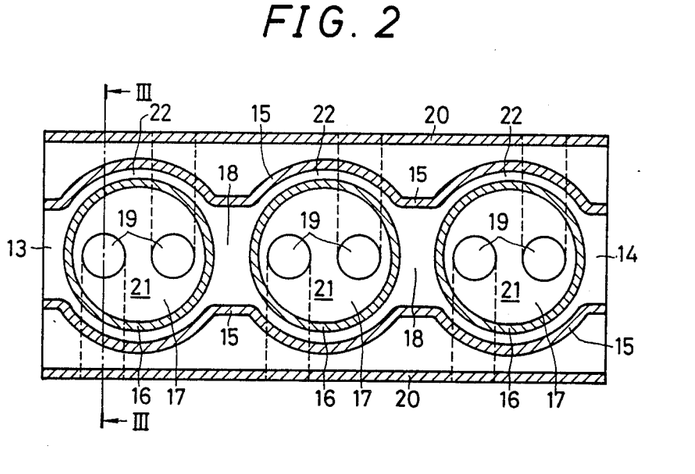
FIG. 2 is another cross sectional view showing a cooling system for the engine as one embodiment of the invention.
Figure 3:
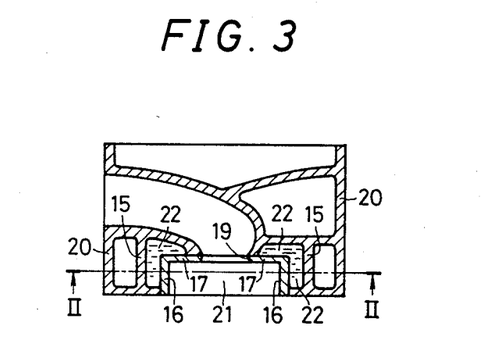
FIG. 3 is a cross sectional view taken along the line III—III of FIG. 2.

Now, referring to FIGS. 2 and 3, one embodiment of the engine cooling system according to the invention will be explained. FIG. 2 is a cross sectional view taken along the line II—II of FIG. 3 and FIG. 3 is a cross sectional view taken along the line III—III of FIG. 2. This cooling system is particularly suited for application to ceramic engines, i.e., heat insulating engines. An example of the heat insulating engine is shown in FIG. 1 in which the engine has a partly heat-insulated structure, which consists of a cylinder body or cylinder block that forms cylinders; cylinder liners of a ceramic material tightly fitted in the cylinder body; and pistons each made up of a ceramic material, an insulating material, both used at the piston head portion, and a piston skirt. As shown in the figure, the upper part 16 of the cylinder wall 16 and the underside 17 of the cylinder head are formed integral as one structural member. The one piece structure is securely fitted into a cylinder head 20 to form a water jacket 22. It is possible to form the upper part 16 of the cylinder wall and the underside 17 of the cylinder head integrally with the cylinder head 20 in one piece. The upper part 16 of the cylinder wall is made of a metal such as cast iron but is cooled at its outer circumference by the water jacket 22, so there is no thermal problem. That is, the water jacket 22 is formed around the entire circumference of the upper parts 16 of the cylinder walls and on the exterior of the underside 17 of the cylinder head to cool the parts facing the combustion chamber 21, which is defined by the underside of the cylinder head, the upper part of the cylinder liner, the cylinder liner and the piston head. The water jacket 22 of the cooling system is formed by the upper parts 16 of the cylinder walls, the underside 17 of the cylinder head, both defining each of the combustion chambers 21, and a cooling passage wall 15 in the cylinder head 20 installed around the outer circumference of the former two members. The water jackets 22 situated around the outer circumference of each combustion chamber 21 are serially connected with each other through cooling passages 18 to form a cooling water circulation passage through which the cooling water is circulated in one direction from one end 13 of the cylinder head 20 to the other 14. Since, as mentioned above, the water jacket 22 is provided only to the upper parts 16 of the cylinder wall situated at the underside 17 of the cylinder head, the water jacket 22 can be made very simple in structure and small in size. The cooling water circulation passage formed by the underside 17 of the cylinder head 20, the upper parts 16 of the cylinder walls and the cooling passage wall 15 of the cylinder head 20 can be made as small as possible. Furthermore, the water jacket 22 of the cooling system can also be made very simple so that the cooling water can flow directly through these water jackets 22 and this in turn reduces the cooling water flow resistance. Therefore, the water pump for circulating the cooling water can also be reduced in capacity. In the figure, reference numeral 19 represents valve seats of the intake and exhaust valves.

The cylinder liner in which the piston reciprocates is not subject to high temperatures and high pressures. Thus, if the cylinder liner is made of a ceramic material to provide a heat insulating effect and improve an anti-galling characteristic, the water jacket or air-cooled fins need not be provided to the cylinder body around the outer periphery of the cylinder liner. To describe in more detail, the cylinder liner is made of a ceramic material such as silicon nitride, silicon carbide and zirconia and is tightly fitted into the cast cylinder body through molding, press fit or shrink fit. Thus, in molding the cylinder body, the core for the water jacket can be eliminated, making the machining operations very easy, reducing the weight of the engine and contributing to a significant cost reduction. As to the piston, though not shown, it is preferable to form it similar to the heat insulating piston of FIG. 1. The explanation of the heat insulating piston is not repeated here as it is already given in the first embodiment.

Figure 4:
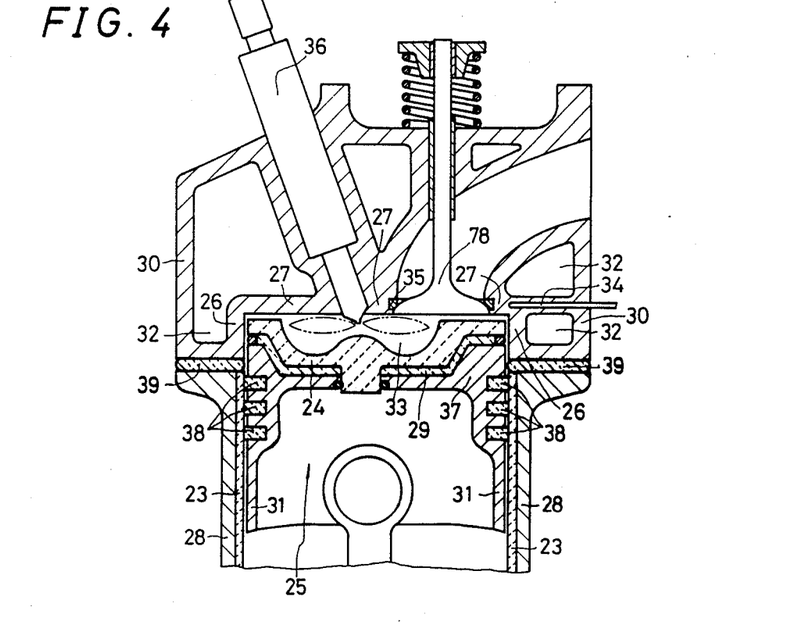
FIG. 4 is a cross sectional view showing a cooling system for heat insulating engines as another embodiment of the invention.

FIG. 4 shows another embodiment of the cooling system for heat insulating engines according to this invention. The heat insulating engine equipped with the cooling system of the invention has a partly heat-insulated structure, which consists mainly of a cylinder head 30, the upper parts 26 of cylinder walls cylinder liners 23 fitted into the cylinders of the cylinder body 28, and pistons 25 each made up of a piston head 24 of ceramics, a piston skirt 31 and a heat insulating material 29. The upper part 26 of the cylinder liner is positioned at the top of the cylinder wall 23 with a gasket 39 interposed. The cylinder head 30 includes the upper parts 26 of the cylinder walls which are formed integral with the underside 27 of the cylinder head. The underside 27 of the cylinder head, the upper part 26 of the cylinder wall, the cylinder liner 23, and the piston head 24 define a combustion chamber 33. To cool the portion facing the combustion chamber 33, a water jacket 32 is formed around the outer circumference of the underside 27 of the cylinder head and the upper part 26 of the cylinder wall. The upper part 26 of the cylinder wall and the underside 27 of the cylinder head are made of such a metal as cast iron but is cooled at their outer walls by the water jacket 32, so that no thermal problem arise.

Since, as mentioned above, the water jacket 32 is provided only to the cylinder head 30 and to the upper parts 26 of the cylinder walls, the water jacket 32 can be made very simple in structure reducing the cooling water flow resistance. This in turn allows the use of a small capacity motor-driven water pump for circulating the cooling water. The cylinder head 30 also has a temperature sensor 34. It is desirable that the temperature sensor 34 be installed where the thermal load is most severe, as between the valve seats 35 of the intake and exhaust valves 78. It is also possible to measure the cooling water temperature directly. The cylinder liner 23 is not heated to extremely high temperatures because the piston 25 has the heat insulating material 29. Therefore, it is not necessary to provide the water jacket to the cylinder body 28 around the outer circumference of the cylinder liners 23. Nor the air-cooled fins need to be provided there. This means that in the process of molding the cylinder body 28 the core for the water jacket can be eliminated, making the maching operations very easy, reducing the weight of the engine and achieving a significant cost reduction. As to the piston 25, the piston head 24 facing the combustion chamber 33 of the engine is made of such a ceramic material as silicon nitride and silicon carbide and is mounted to the piston body 37 including the piston skirt 31 through the heat insulating material 29 of ceramics. With the piton head 24 formed of ceramics and with the insulating material 29 of ceramics provided, the heat generated in the combustion chamber 33 can be prevented from being carried down to the cylinder liner. Piston rings 38 of ceramics are fitted in the piston ring grooves in the piston body 37.

The combustion chamber 33 may, for example, be formed by making recesses on the piston head 24 as shown. Or in the diesel engine, for the purpose of accommodating the fuel injection nozzle 36, it is also possible to make the cylinder head rise radially outwardly to form the combustion chamber near the inner circumferential surface of the upper part 66 of the cylinder wall. As another example of the piston 25, it may be formed by mounting on the piston skirt the piston head which has a ceramic material formed flat on the side of the combustion chamber 33, with the heat insulating material interposed between the piston head and the piston skirt. In this case, the ceramic material portion of the piston head 4 may be made of ceramics such as silicon nitride and silicon carbide and formed thin to reduce the heat capacity of that portion. With the piston head 4 formed flat, it is possible to form the combustion chamber by making the central portion of the cylinder head recessed and the outer circumferential portion of the cylinder head raised. The heat insulating material 29 interposed between the piston head 24 and the piston body 37 is made of such materials as potassium titanate, potassium titanate whisker, zirconia fiber and alumina fiber, as with the preceding embodiments, to provide a heat insulating effect and also to serve as a structural member to absorb the pressure generated at time of detonation.

Figure 5:
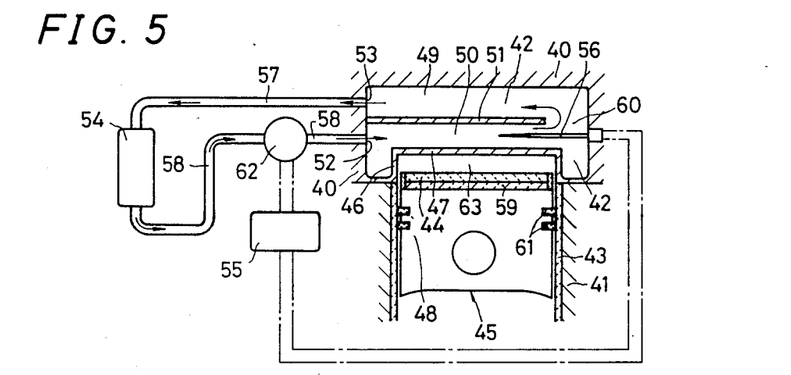
FIG. 5 is a schematic diagram showing the working principle of a cooling system for heat insulating engines of the invention which has another structure of the water jacket.

Next, by referring to FIG. 5, the cooling system of the heat insulating engine and another example of the water jacket are explained. FIG. 5 is a schematic diagram showing the working principle of the cooling system for the heat insulating engine according to the invention. In the figure, the intake and exhaust valves and their valve seats are not shown for simplicity.

A cylinder head 40 consists of an underside 47 of the cylinder head and upper parts 46 of the cylinder walls both formed integral in one piece. A water jacket 42 is divided into two vertical layers, an upper water jacket 49 and a lower water jacket 50, separated by a partition wall 51 formed of casting. The upper and lower water jackets 49 and 50 are communicated with each other at one end through a passage 60. An inlet 52 and an outlet 53 of the water jacket 42 are provided at one end of the cylinder head 40, with the inlet 52 formed in the lower water jacket 50 and the outlet 53 in the upper water jacket 49 to cause the cooling water to circulate in the direction indicated by the arrow. In this construction, the water jacket 42 can be made compact and the piping short and simple, improving the freedom of layout of the piping and other associated parts. It is of course possible to reverse the positions of the inlet and outlet of the cooling water. While, in the figure, a temperature sensor 56 is inserted in the lower water jacket 50 to measure the temperature of the cooling water, it may also be installed between the intake and exhaust valve seats where the temperature is the highest. For the cooling water to circulate between the water jacket 42 and the radiator 54, the water jacket 42 is connected with the radiator 54 through pipes 57, 58, with a motor-driven water pump 62 installed in the pipe 58. That is, the water pump 62 is driven by a motor so that it can be driven independently of the engine condition. The power for driving the water pump 62 may be obtained directly from the energy recovery equipment installed in the heat insulating engine or from the battery. The water pump 62 is controlled by a controller 55 according to signals from the temperature sensor 56. More specifically, the water pump 62 is controlled in the following way. When the temperature of the cylinder head 40 or the cooling water measured by the temperature sensor 56 is high, the flow of the circulating cooling water is increased. When the measured temperature is low, the cooling water flow is reduced. Since the control of the water pump 62 is performed independently of the engine running condition, the flow of the cooling water can freely be controlled irrespective of the running condition of the engine. This makes it possible to minimize the loss for driving the engine cooling system. The piston 45 and the cylinder body 41 have heat insulating structures, as show. That is, the cylinders formed in the cylinder body 41 have ceramic cylinder liners 43 tightly fitted therein. The piston 45 consists of a piston head 44 of ceramics installed on the side of the combustion chamber 63, and a piston body 48 to which the piston head 44 is secured through a heat insulating material 59. In the figure, reference numeral 61 signifies piston rings.

Figure 6:
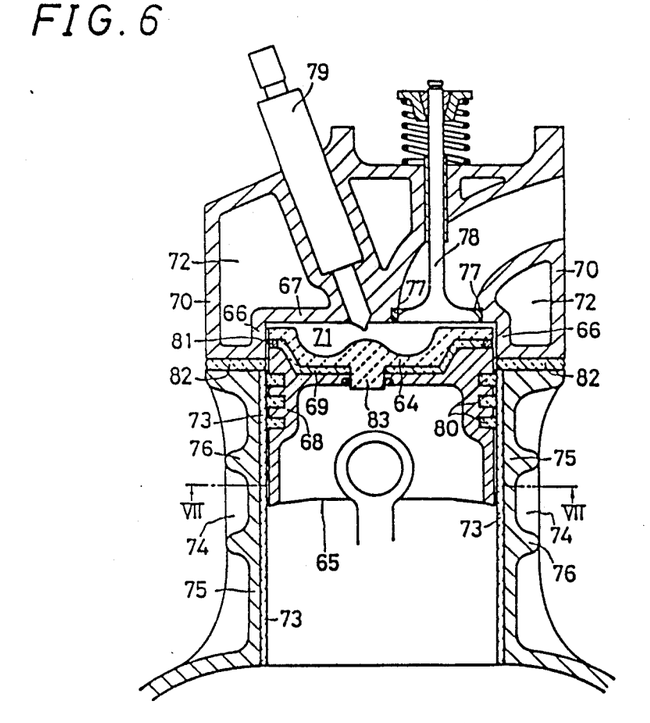
FIG. 6 is a cross sectional view showing a cooling system for heat insulating engines as still another embodiment of the invention.
Figure 7:
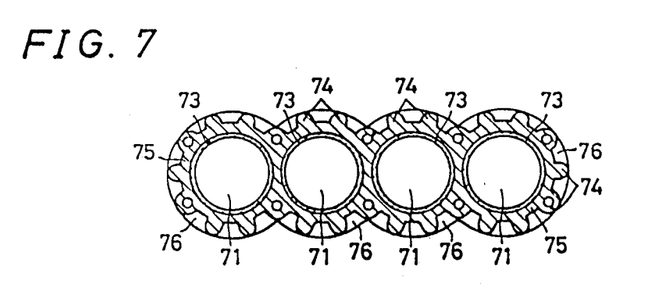
FIG. 7 is a cross sectional view of a cylinder body taken along the line VII—VII of FIG. 6.

Now, referring further to FIGS. 6 and 7, we will explain a further embodiment of the cooling system for heat insulating engine according to the invention. The heat insulating engine having the cooling system of this invention consists mainly of: a cylinder head 70 including upper parts 66 of cylinder walls and an underside 67 of the cylinder head; a cylinder body forming cylinders; cylinder liners 73 tightly fitted into the cylinders; and pistons 65 each consisting of a ceramic piston head 64, a piston body 68 including a piston skirt, and a heat insulating material 69. The upper part 66 of the cylinder wall is positioned at the top of the cylinder liner 73 with a gasket 82 interposed. The cylinder liner 73 tightly fitted into the cylinder body 75 is made of a ceramic material such as silicon nitride, silicon carbide and zirconia to improve the anti-galling characteristic at high temperatures thereby maintaining a good sliding performance of the piston 65. As shown in the figure, the upper part 66 of the cylinder wall and the cylinder head 70 are formed integral in one piece. The upper part 66 of the cylinder wall is made of a metal such as cast iron, but since it is cooled at the external wall by the water jacket 72, no thermal problem will arise. That is, the water jacket 72 is formed in the cylinder head 70 around the outer periphery of the upper parts 66 of the cylinder walls to cool the parts facing the combustion chambers 71. In this way, the water jacket 72 is provided only to the cylinder head 70 and the upper parts 66 of the cylinder walls. Furthermore, no water jacket is formed in the cylinder body 75 below the cylinder head in which the cylinder liners 73 are fitted. Because of this construction, the jacket 72 can be made very simple in structure, reducing the cooling water flow resistance. This in turn allows the use of a small capacity water pump for circulating the cooling water. Moreover, since the piston 65 is made up of the heat insulating material 69 and the ceramic piston head 64, the cylinder liner 73 in which the piston 65 reciprocates will not be heated to high temperatures. Even so, by forming the cylinder liner 73 with a ceramic material which has a good sliding characteristic, the cylinder liner 73 fitted into the cylinder body 75 will have an improved durability. Therefore, the cylinder body 75 with such cylinder liners 73 requires no water jackets.

In the conventional cylinder block, the cylinder body which is installed inside the water jacket is thin and complex in shape and thus produces a resonance which is a source of noise. In the heat insulating engine having the above cooling system of the invention, however, the cylinder body 75 has a much greater freedom in design which allows noise-prevention measures on the cylinder liner 73 which has been a source of noise. One example of the noise-prevention measure is that a plurality of lateral ribs 76 (FIG. 6) and longitudinal ribs 74 (FIG. 7) are formed on the outer circumferential surface of the cylinder body 75. These ribs formed on the cylinder body 75 increase the rigidity of the cylinder body 75 and improve the deformation resistance of the cylinder liners 73. This in turn prevents the vibration and therefore the noise of the cylinder liners 73. Moreover, in molding the cylinder body 75, the core for the water jacket can be eliminated, making the molding process very easy. The elimination of the water jacket also contributes to reduction in the engine weight and to a significant cost reduction.

As for the piston 65, the piston head 64 facing the combustion chamber 71 is made of a ceramic material such as silicon nitride and silicon carbide. The piston head 64 is securely mounted, through a heat insulating material 69 of ceramics, on a piston body 68 which includes a piston skirt. That is, the mounting boss 83 at the center of the piston head 64 is fitted into the mounting hole formed in the center of the piston body 68. A secure engagement between the mounting boss 83 and the hole of the piston body 68 is obtained through a metal flow. In this case, it is desirable that a heat insulating gasket 81 be mounted around the outer periphery of the heat insulating material 69 which is interposed between the piston head 64 and the piston body 68, in order to prevent the heat insulating material 69 from being exposed directly to the burning gas. In this construction, the ceramic piston head 64 and the ceramic heat insulating material 69 combine to prevent the heat generated in the combustion chamber 71 from flowing down to the cylinder liner 73.

The combustion chamber 71 may be formed by recessing the piston head, as shown, or by forming a step on the upper part of the cylinder liner. In the diesel engine, for the purpose of accommodating the fuel injection nozzle 79, the underside 67 of the cylinder head may be raised radially outwardly to form the combustion chamber 71 near the inner curcumferential surface of the upper part 66 of the cylinder wall. As another example of the piston 65, the piston head 64 having a ceramic material formed flat on the side of the combustion chamber 71 can be mounted to the piston skirt with a heat insulating material interposed In this case, the piston head ceramic material is made of silicon nitride or silicon carbide and formed thin to reduce the thermal capacity of the piston head insulating material. With the piston head 64 formed flat on the combustion chamber side, it is possible to form the combustion chamber 71 by recessing the central part of the cylinder head and raising the outer circumferential portion of the cylinder head. The heat insulating material 69 interposed between the piston head 64 and the piston body 68 may be made of such materials as potassium titanate, potassium titanate whisker, zirconia fiber and alumina fiber to provide a heat insulating effect and to serve as a structural member that absorbs the pressure generated at time of detonation. In the figure, reference numeral 77 represents valve seats, 78 intake and exhaust valves, and 80 piston rings.

We claim:

1. A cooling system for heat insulating engines comprising:
 a cylinder body that forms cylinders but has no water jacket;
 cylinder liners of ceramics fitted into the cylinders of the cylinder body;
 upper parts of the cylinder walls situated at the top of the cylinder liners:
 a cylinder head having the upper parts of the cylinder walls formed integral therewith as one structural member, the cylinder head being secured to the cylinder body;
 a water jacket formed around the outer periphery of the upper parts of the cylinder walls;
 intake ports and exhaust ports formed in the cylinder head;
 pistons that reciprocate in the cylinder liners, each of the pistons including a piston head of ceramics secured to a piton body with a heat insulating material interposed; and
 combustion chambers formed by the upper parts of the cylinder walls the cylinder head, the cylinder liners, and the piston heads.

2. A cooling system for heat insulating engines as set forth in claim 1, wherein the cooling water in the water jacket formed around the outer peripheral walls of the upper parts of the cylinder walls cools the high-temperature portions around the combustion chambers near the top dead centers of the pistons.

3. A cooling system for heat insulating engines as set forth in claim 1, wherein piston rings of ceramics are tightly fitted in piston ring grooves formed on the outer circumferential surfaces of the pistons.

4. A cooling system for heat insulating engines as set forth in claim 1, wherein intake valves are installed in the intake ports and exhaust valves are installed in the exhaust ports.

5. A cooling system for heat insulating engines as set forth in claim 1, wherein the upper parts of the cylinder walls and the cylinder head are made of a metal.

6. A cooling system for heat insulating engines as set forth in claim 1, wherein the cylinder liners are made of silicon nitride.

7. A cooling system for heat insulating engines a set forth in claim 1, wherein the cylinder liners are made of silicon carbide.

8. A cooling system for heat insulating engines as set forth in claim 1, wherein the cylinder liners are made of zirconia.

9. A cooling system for heat insulating engines as set forth in claim 1, wherein the piston heads are made of silicon nitride.

10. A cooling system for heat insulating engines as set forth in claim 1, wherein the piston heads are made of silicon carbide.

11. A cooling system for heat insulating engines as set forth in claim 1, wherein the piston heads are formed of thin plates which have flat surfaces on the side exposed to the burning gas.

12. A cooling system for heat insulating engines as set forth in claim 1, wherein the piston heads are formed with a recess on the side exposed to the burning gas, the recess forming a part of the combustion chamber.

13. A cooling system for heat insulating engines as set forth in claim 1, wherein the mounting of the piston heads to the piston bodies is accomplished by fitting a mounting boss formed at the center of the piston head into a mounting hole formed at the center of the piston body.

14. A cooling system for heat insulating engines as set forth in claim 13, wherein the heat insulating materials are interposed between the piston heads and the piston bodies, and heat insulating gaskets are installed around the outer peripheries of the heat insulating materials.

15. A cooling system for heat insulating engines as set forth in claim 1, wherein the cooling water in the water jacket is circulated by a motor-driven water pump.

16. A cooling system for heat insulating engines as set forth in claim 1, wherein a temperature sensor to detect the temperature of the cooling water in the water jacket is installed in the cylinder head.

17. A cooling system for heat insulating engines as set forth in claim 1, wherein a temperature sensor to detect the temperature of the cooling water in the water jacket is installed in the cooling water.

18. A cooling system for heat insulating engines as set forth in claim 1, wherein the water jacket is divided into two layers of an upper jacket and a lower jacket, the two water jackets are communicated with each other at one end, a cooling water inlet is formed at the other end of one water jacket and a cooling water outlet is formed at the other end of the other water jacket so that the cooling water inlet and outlet are formed on one side of the cylinder head.

19. A cooling system for heat insulating engines as set forth in claim 1, wherein fuel injection nozzles are installed in the cylinder head.

20. A cooling system for heat insulating engines as set forth in claim 1, wherein reinforcement ribs are formed on the outer circumferential surface of the cylinder body in which the cylinder liners are tightly fitted.

21. A cooling system for heat insulating engines as set forth in claim 20, wherein the ribs are lateral ribs extending transversely on the cylinder body.

22. A cooling system for heat insulating engines as set forth in claim 20, wherein the ribs are longitudinal ribs extending longitudinally on the cylinder body.

23. A cooling system for engines comprising:

a cylinder body having cylinder liners therein but no water jacket;
upper parts of the cylinder walls situated at the top of the cylinder liners;
a cylinder head having the upper parts of the cylinder walls formed integral therewith, the cylinder heads being rigidly secured to the cylinder body;
water jackets formed around the outer peripheries of the upper parts of the cylinder walls, the water jackets being serially connected with each other;
intake ports and exhaust ports formed in the underside of the cylinder head;
pistons that reciprocate in the cylinder liners; and
combustion chambers formed by the cylinder head, the upper parts of the cylinder walls, the cylinder liners and the pistons.

24. A cooling system for engines as set forth in claim 23, wherein cooling passages are formed to connect the water jackets in series that are formed around the entire periphery of the upper part of the cylinder wall, which forms a part of the combustion chambers, and the cooling water is circulated through the cooling passages in one direction from one end of the cylinder head to the other.

25. A cooling system for engines as set forth in claim 23, wherein the cylinder liners are made of a ceramic material.

26. A cooling system for engines as set forth in claim 23, wherein the pistons include the piston bodies and the ceramic piston heads mounted to the piston bodies through the insulating materials.

* * * * *